Nov. 10, 1925.
C. LE G. FORTESCUE
1,561,319
SINGLE PHASE DISTRIBUTING METHOD AND SYST
Filed April 13, 1922
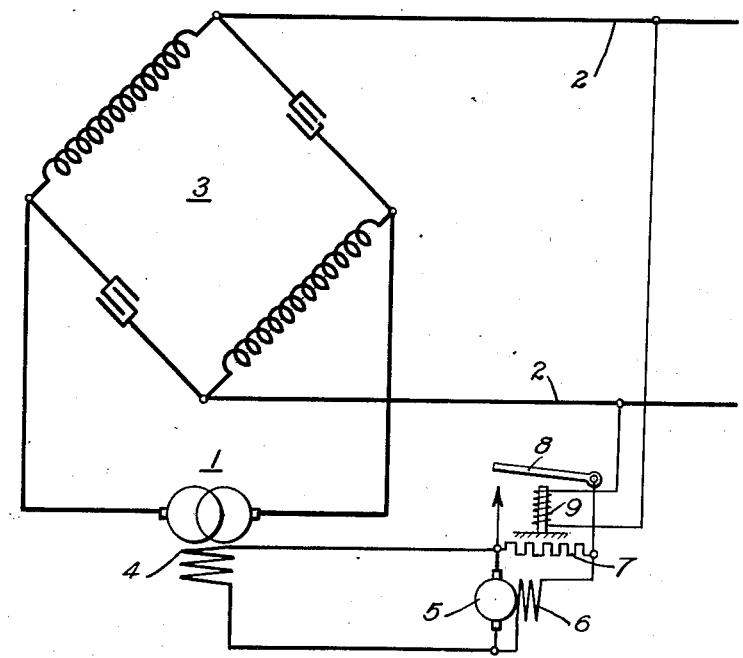
WITNESSES:
INVENTOR
Charles Le G. Fortescue
BY
ATTORNEY Patented Nov. 10, 1925.

1,561,319

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

SINGLE-PHASE DISTRIBUTING METHOD AND SYSTEM.

Application filed April 13, 1922. Serial No. 552,243.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Single-Phase Distributing Methods and Systems, of which the following is a specification.

My invention relates to distributing systems and it has particular reference to the regulation and overload protection of single-phase systems.

An object of my invention is to provide means for maintaining good voltage regulation under operating conditions but, at the same time, to limit the short-circuit or overload currents to a relatively low value.

The two conditions just mentioned are, in general, incompatible, since the means employed for maintaining the voltage under varying current conditions also operates to maintain the voltage during overload conditions, thus producing severe overload currents.

It is, therefore, a more specific object of my invention to energize a distributing line through a transforming apparatus which has the property of converting the distributing line into a constant-current line when the supply voltage is maintained constant, said supply voltage being normally regulated in such manner as to maintain a constant voltage upon the distributing line. By means of such arrangement the maximum possible voltage of the supply means renders the regulating device inoperative when the load current exceeds a certain critical value, whereupon the supply means will operate as a constant-voltage source and the distributing line will become a constant-current line, thus limiting the value of the maximum possible current which can be drawn therefrom by a short circuit.

A further object of my invention is to provide a single-phase line supplied, through a monocyclic square, from a single-phase alternator the voltage of which is automatically varied in such manner as to maintain a constant voltage on the single-phase line during normal operating conditions.

In the accompanying drawing, the single figure is a diagrammatic view showing circuits and apparatus embodying my invention in a preferred form.

Referring to the drawing for a more complete understanding of the invention, I have shown an alternator 1 supplying a single-phase line 2 through a moncyclic square 3 or other static net-work having the property of transforming the generated energy into energy having a current value proportional to a function of the generated voltage regardless of the load. The monocyclic square 3 is preferably utilized as a step-up transformer for supplying power at a relatively high potential in the line 2.

The alternator 1 is provided with a field winding 4 that is excited by means of an exciter 5 which, in turn, has a field winding 6 to be energized in series with a relatively high-resistance device 7. The resistance device just mentioned is adapted to be short-circuited by means of a relay 8 which may be any preferred form of voltage regulator embodying a coil 9 energized across the single-phase line 2.

By means of the apparatus just described, the voltage of the alternator may be varied from a minimum value corresponding to the open position of the relay 8 to a certain maximum value produced by the continued short-circuiting of the field resistor 7.

It will be understood that, as the load varies on the single-phase line 2, it is necessary to vary the voltage of the alternator 1 in order to maintain the constant-voltage condition on the line 2. As the load increases more and more, the relay 8 will be opened and closed at a varying rate such that an ever increasing proportion of the time is consumed in the closed position thereof, until finally the relay 8 is permanently closed and the regulating device is powerless to regulate any further. The alternator 1 then becomes a constant-voltage generator generating its maximum voltage, and the current in the line 2 is prevented from rising any higher by means of the static transforming device 3.

While I have described certain characteristics of my invention in detail, and while I have pointed out certain of the most obvious principles and purposes thereof, I do not intend that the language employed in the following claims shall be limited to the precise features described, but I intend that the claims shall be construed to cover all modifications which are fairly comprehended by the language thereof, when read in connection with the prior art, regardless of the details and functions mentioned in the description or illustrated in the drawing.

I claim as my invention:

1. The method of regulating an electric transmission line for substantially constant voltage under normal load conditions while limiting the overload current to a relatively low value, said line being supplied by a generator through a transforming means such that the line becomes a constant-current line when the generated voltage is constant, said method comprising regulating the voltage of said generator, between predetermined limits, in such manner as to maintain a substantially constant voltage on said line under normal load conditions, the overload current being limited by the maximum limit of said generator voltage.

2. A method of regulating a transmission line supplied from an alternating-current source through a static network of the type tending to effect a constant-voltage constant-current transformation, said method consisting in the step of regulating the voltage of said source to maintain a substantially constant voltage on said line.

3. An electric system of transmission comprising a source of variable-voltage energy, means for transforming the same into energy having a current value proportional to a function of the generated voltage regardless of the load, and electro-responsive means for causing the generated voltage to vary in a predetermined manner in accordance with the departure of the voltage of the transformed energy from a predetermined constant value.

4. The combination with a transmission line, of an electric generator therefor, transforming means for interconnecting the same in such manner that the line becomes a constant-current line when the generated voltage is constant, and electro-responsive means for regulating the voltage of said generator, between predetermined limits, in such manner as to maintain a substantially constant voltage on said line under normal load conditions, the overload current being limited by the maximum limit of said generator voltage.

5. The combination with a single-phase line, of an alternator therefor, a static network interconnecting the same in such manner as to effect a constant-voltage, constant-current transformation, and electro-responsive means for regulating the voltage of said alternator to maintain a substantially constant voltage on said line.

6. The combination with an alternator, of a monocyclic square for transforming from low-tension to high tension and means responsive to the high-tension voltage for regulating said alternator.

7. The combination with a single-phase line, of an alternator therefor, a static network interconnecting the same in such manner as to effect a constant-voltage constant-current transformation and means responsive to the voltage of said line for regulating the voltage of said alternator between predetermined limits, the upper limit being selected in accordance with the maximum desired load conditions.

8. The combination with a source of variable-voltage energy, means inherently operative to transform the same into energy having a current value proportional to a function of the generated voltage regardless of the load and means responsive to the voltage of the transformed energy for causing the voltage of said source to vary, between predetermined upper and lower limits, in such manner as to obtain a desired voltage characteristic for said transformed energy under normal load conditions, said voltage characteristic inherently dropping under overload conditions as predetermined by said upper limit.

9. The combination with an inherently constant-current supply system, of regulating means for controlling the line voltage thereof.

10. The combination with an inherently constant-current supply system, of regulating means for controlling the voltage thereof, said regulating means including means for rendering the same inoperable during predetermined load conditions.

In testimony whereof, I have hereunto subscribed my name this 11th day of April 1922.

CHARLES LE G. FORTESCUE.